United States Patent
Bhagavatula et al.

(10) Patent No.: US 10,791,165 B2
(45) Date of Patent: Sep. 29, 2020

(54) CONTROLLING WIRELESS DEVICES USING AGGREGATED DATA FROM CROSS-NETWORK ACCESS POINTS

(71) Applicant: Google LLC, Mountain View, CA (US)

(72) Inventors: Ramya Bhagavatula, Palo Alto, CA (US); Srinivasa Kumar Duvvuri, San Jose, CA (US); Zhifeng Cai, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/378,145

(22) Filed: Apr. 8, 2019

(65) Prior Publication Data
US 2019/0312924 A1 Oct. 10, 2019

Related U.S. Application Data (60) Provisional application No. 62/655,414, filed on Apr. 10, 2018.

(51) Int. Cl.
| | |
|---|---|
| *H04W 72/04* | (2009.01) |
| *H04L 29/08* | (2006.01) |
| *H04L 12/24* | (2006.01) |
| *H04L 29/12* | (2006.01) |
| *H04W 84/12* | (2009.01) |
| *H04W 88/08* | (2009.01) |

(52) U.S. Cl.
CPC .......... *H04L 67/10* (2013.01); *H04L 41/5003* (2013.01); *H04L 61/6022* (2013.01); *H04W 72/04* (2013.01); *H04W 84/12* (2013.01); *H04W 88/08* (2013.01)

(58) Field of Classification Search
CPC . H04L 67/10; H04L 41/5003; H04L 61/6022; H04W 72/04; H04W 84/12; H04W 88/08
See application file for complete search history.

(56) References Cited

U.S. PATENT DOCUMENTS

| | | | |
|---|---|---|---|
| 9,009,805 B1 * | 4/2015 | Kirkby | G06F 3/04855 726/7 |
| 9,179,436 B1 * | 11/2015 | Dhammawat | H04L 61/6059 |
| 10,026,049 B2 * | 7/2018 | Asenjo | H04L 63/14 |

(Continued)

OTHER PUBLICATIONS

"International Search Report and Written Opinion", PCT Application No. PCT/US2019/026494, dated Jul. 5, 2019, 19 pages.

*Primary Examiner* — Kevin D Mew
(74) *Attorney, Agent, or Firm* — Colby Nipper PLLC (57) ABSTRACT

This document describes methods, devices, systems, and means for controlling wireless devices using aggregated data from cross-network access points. An access point (AP) provides operational information from a plurality of different types of client devices communicating with the AP to a cloud service and obtains per-client-device-type policy data from the cloud service that is based on aggregated operational information from a plurality of different types of client devices from different AP networks. The AP controls, using a wireless transceiver, a wireless client device that is of a first type, using the per-client-device-type policy data for the first type based on aggregated operational information from a plurality of different types of client devices from different AP networks.

20 Claims, 6 Drawing Sheets

(56) References Cited

U.S. PATENT DOCUMENTS

| | | | |
|---|---|---|---|
| 2013/0203036 A1* | 8/2013 | Jabara | G06Q 30/0207 |
| | | | 434/350 |
| 2014/0162629 A1 | 6/2014 | Tipton et al. | |
| 2014/0273950 A1* | 9/2014 | Li | G06F 3/0481 |
| | | | 455/410 |
| 2015/0071271 A1* | 3/2015 | Smedman | H04L 9/14 |
| | | | 370/338 |
| 2015/0134809 A1* | 5/2015 | Tofighbakhsh | H04L 63/083 |
| | | | 709/224 |
| 2015/0180945 A1* | 6/2015 | Hall | H04W 4/60 |
| | | | 709/203 |
| 2015/0215832 A1* | 7/2015 | Fitzpatrick | H04W 48/14 |
| | | | 455/426.1 |
| 2015/0341830 A1* | 11/2015 | Jeong | H04W 28/0268 |
| | | | 370/329 |
| 2016/0014154 A1* | 1/2016 | Huang | H04W 12/0808 |
| | | | 726/1 |
| 2016/0127875 A1* | 5/2016 | Zampini, II | G01S 5/0226 |
| | | | 370/311 |
| 2016/0278147 A1* | 9/2016 | Adrangi | H04W 4/80 |
| 2016/0302136 A1* | 10/2016 | Bergstrom | H04W 48/00 |
| 2016/0330602 A1* | 11/2016 | Das | H04W 12/06 |
| 2017/0171068 A1* | 6/2017 | Morper | H04L 45/74 |
| 2017/0195896 A1* | 7/2017 | Lee | H04L 41/0893 |
| 2017/0251409 A1* | 8/2017 | Wegmann | H04W 76/18 |
| 2017/0251514 A1* | 8/2017 | Soderlund | H04L 67/148 |
| 2017/0289047 A1* | 10/2017 | Szilagyi | H04L 41/0853 |
| 2017/0366983 A1* | 12/2017 | Gunasekara | H04W 24/08 |
| 2019/0021004 A1* | 1/2019 | Shanmugavadivel | H04L 63/10 |
| 2019/0141919 A1* | 5/2019 | Kundra | A01G 25/165 |
| | | | 348/159 |

\* cited by examiner

CONTROLLING WIRELESS DEVICES USING AGGREGATED DATA FROM CROSS-NETWORK ACCESS POINTS

CROSS REFERENCE TO RELATED APPLICATIONS

This Application claims priority under 35 U.S.C. § 119(e) to U.S. Provisional Patent Application Ser. No. 62/655,414, filed Apr. 10, 2018, the disclosure of which is incorporated by reference herein in its entirety.

BACKGROUND

Wireless Local Area Networks (WLANs) including wireless mesh networks have one or more access points (APs) whether in a router, speaker, or other device in different rooms that communicate with various types of wireless or wired client devices in a building. As such, one AP network can consist of multiple APs and multiple different types of client devices. Some AP networks provide handovers between APs in the same building or environment so that a client device, such as a smartphone, tablet, wearable, or other device can be handed over from one AP to another AP in the same network to provide a higher signal strength as the user moves the device throughout the environment. However, many current AP networks have an inefficient connectivity tuning with respect to different types of wireless devices.

SUMMARY

This summary is provided to introduce simplified concepts of controlling wireless devices using aggregated data from cross-network access points. The simplified concepts are further described below in the Detailed Description. This summary is not intended to identify essential features of the claimed subject matter, nor is it intended for use in determining the scope of the claimed subject matter.

A method (and system) for controlling a client device in a first access point (AP) network by a cloud service is described in which a cloud service aggregates operational information from a plurality of different types of wireless client devices that are in different AP networks (e.g., from the first access point) and generates per-client-device-type policy data for an AP in the first AP network, the per-client-device-type-policy data being based on the aggregated operational information from the plurality of different types of wireless client devices from the different AP networks. The cloud service provides the per-client-device-type policy data to the AP in the first AP network that is effective to direct the AP to control the client device.

A method for controlling a wireless client device by an access point in an AP network is described in which the AP provides operational information from a plurality of different types of client devices communicating with the AP to a cloud service and obtains per-client-device-type policy data from the cloud service that is based on aggregated operational information from a plurality of different types of client devices from different AP networks. The AP controls the wireless client device that is of a first type, using the per-client-device-type policy data for the first type based on aggregated operational information from a plurality of different types of client devices from different AP networks.

A wireless local area network (WLAN) access point device is described that includes a wireless transceiver, a controller, and a memory comprising instructions executable by the controller to configure the AP to provide operational information from a plurality of different types of client devices communicating with the AP to a cloud service. The instructions are executable to obtain per-client-device-type policy data from the cloud service that is based on aggregated operational information from a plurality of different types of client devices from different AP networks and control, using the wireless transceiver, a wireless client device that is of a first type by using the per-client-device-type policy data for the first type based on aggregated operational information from a plurality of different types of client devices from different AP networks.

BRIEF DESCRIPTION OF THE DRAWINGS

The details of one or more aspects of controlling wireless devices using aggregated data from cross-network access points are described below. The use of the same reference numbers in different instances in the description and the figures may indicate like elements.

DETAILED DESCRIPTION

This document describes methods, devices, systems, and means for controlling wireless devices using aggregated data from cross-network access points. An access point (AP) provides operational information from a plurality of different types of client devices communicating with the AP to a cloud service and obtains per-client-device-type policy data from the cloud service that is based on aggregated operational information from a plurality of different types of client devices from different AP networks. The AP controls, using a wireless transceiver, a wireless client device that is of a first type, by using the per-client-device-type policy data for the first type based on aggregated operational information from a plurality of different types of client devices from different AP networks. An access point (AP), such as a wired or wireless building AP, collects operational information including statistics and metrics related to the operation of each of its associated client devices and uploads the operational information to a cloud service. The cloud service uses this information to generate per-client-device-type profile data and policies to optimize the performance of each device type using operational information about the same device type from different AP networks. The group of different AP networks can be any desired grouping such as, but not limited to, all APs in a particular geographic region, across each client type in a particular region such as a state or across country, or mesh-enabled access points in different networks. Profiling the behavior of different client types across the same device type or different device types from different AP networks allows a particular device type to be tuned and have connectivity optimized on a per-client-device-type basis. Aggregating the operational information from different AP networks allows the quick collection significant statistics for a large number of different types of wireless devices and/or for a new type of a wireless device.

Figure 1:
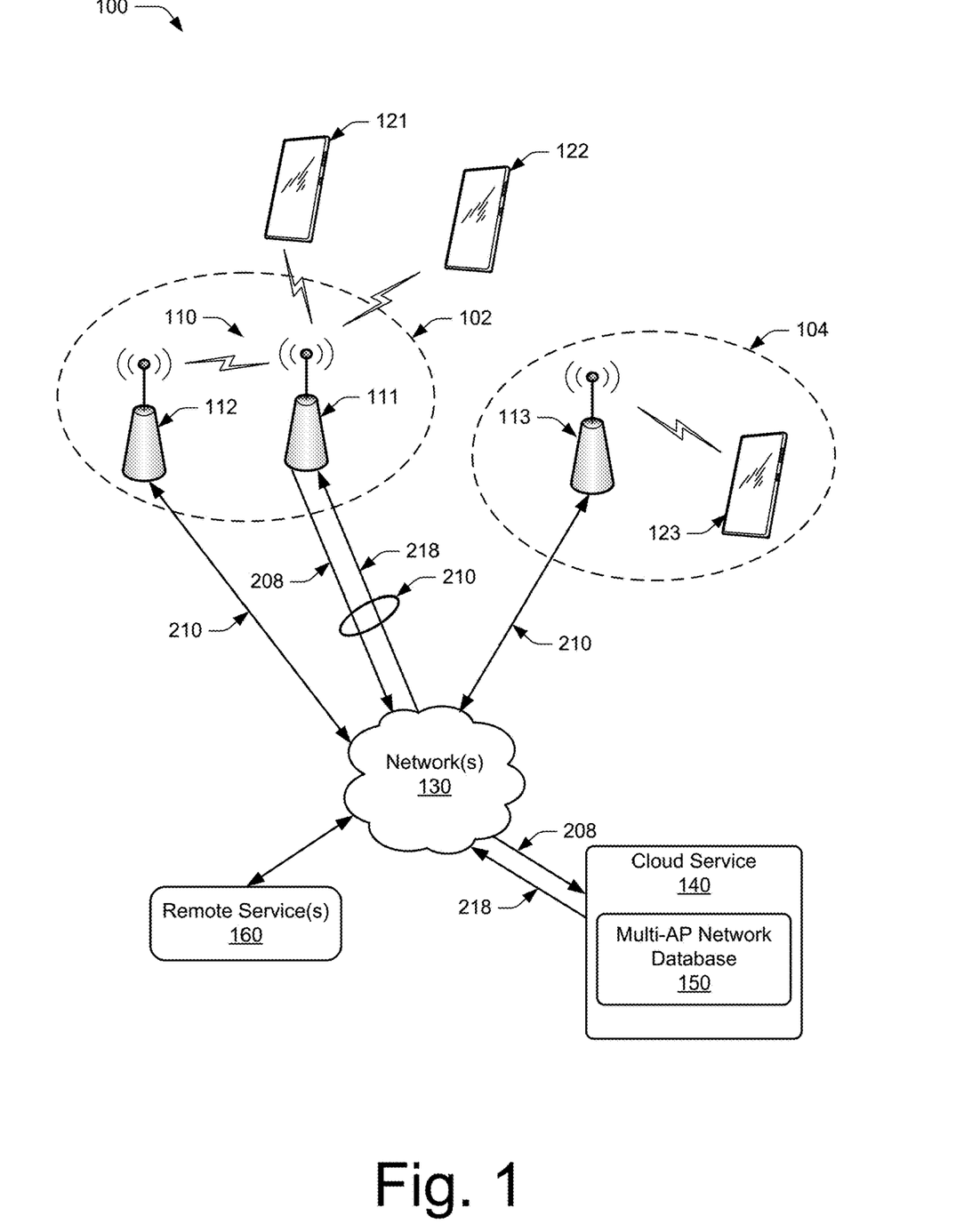
FIG. 1 illustrates an example wireless network environment in which various aspects of controlling wireless devices using aggregated data from cross-network access points can be implemented.

FIG. 1 illustrates an example wireless network environment 100 in which various aspects of controlling wireless devices using aggregated data from cross-network access points can be implemented. AP networks 102 and 104 are illustrated that each provide access to one or more networks 130 such as the Internet, a Wide Area Network (WAN), Local Area Network (LAN), wireless wide area networks (WWANs) (e.g., cellular networks), wireless local area networks (WLANs), or any other suitable network or combination of networks. The AP networks 102 and 104 may be star networks, mesh networks, or any other network with a suitable network topology. In this example, a cloud service 140 (or system), including one or more cloud servers, maintains a multi-AP network database 150. The cloud service 140 aggregates client device operational information provided by each AP for respective associated client devices. In this example, AP network 102 includes two access points 111 and 112. Client devices 121 and 122 are associated with the access point 111. Access point 112 also has associated client devices which are not shown in FIG. 1 for the sake of clarity. A different AP network 104, in a different building or other environment, also includes an access point 113 and associated client device 123. The various wireless client devices may communicate through associated access points to the Internet to obtain content from one or more remote services 160 and/or communicate with a cellular network or other networks as known in the art. The various client devices 121, 122, and 123 may be any suitable wired or wireless device such as, but not limited to, smartphones, wearables, laptops, television monitors, set top boxes, game consoles, appliances, tablets, printers, desktops, speakers, or any other suitable device.

Figure 2:
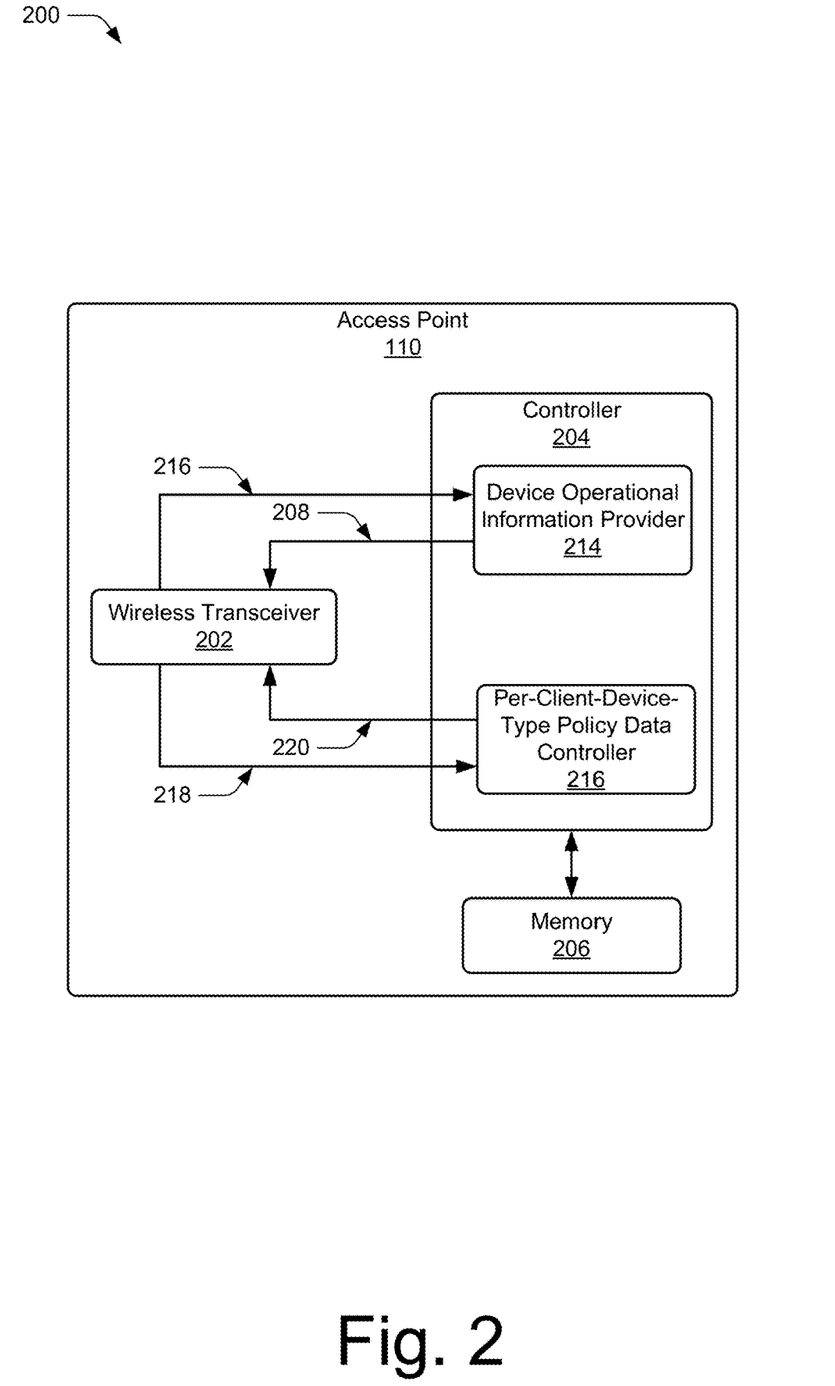
FIG. 2 illustrates an example device diagram of an access point that can implement various aspects of controlling wireless devices using aggregated data from cross-network access points.

FIG. 2 illustrates an example device diagram of an access point 110 that can implement various aspects of controlling wireless devices using aggregated data from cross-network access points. Referring also to FIG. 2, each access point 110 (shown as 111, 112, and 113 in FIG. 1) controls one or more respective wireless client devices that are in their respective networks. Each access point 110 includes a wireless transceiver 202 that is configured to communicate using one or more radio access technologies such as WLAN (e.g., Wi-Fi) in one or more frequency bands, such as a 5 GHz band, a 2.4 GHz band, or any other suitable frequency band) and/or communicate with wireless wide area networks (e.g., cellular networks), Bluetooth networks, or any other suitable network as desired. The access point 110 also includes a controller 204 which may be one or more processors that execute stored instructions that when executed, cause the one or more processors to perform operations as described herein. As recognized in the art, the processor may include one or more processing cores. The access point 110 also includes memory 206, such as RAM, ROM, and/or any suitable memory that stores the executable instructions, per-client-device-type policy data, and any other information as necessary to perform various functions of the access point 110. For example, the controller 204 provides operational information 208 obtained from the different types of wireless client devices 121 and 122 communicating with the access point 111. The operational information 208 (device operational information 208) is provided to the cloud service 140.

The operational information 208 can include any desired operational information on an AP level and/or device-type level. In this example, per-device operational information includes, but is not limited to, device type transmit characteristics, receive characteristics, data rate vs. signal strength characteristics, connection characteristics for different radio access technologies, error rate characteristics, and connectivity events. The operational information from associated client devices is sent by each of the different AP networks 102 and 104, as illustrated at 210 in FIG. 1. The device operational information 208 can be obtained and formatted for the cloud service 140 in any suitable manner. In one example, the device operational information provider 214 included in the access point 111 sends the hash of MAC addresses for the different client device types along with associated operational characteristics to the cloud service 140. However, any suitable device identifier data can be employed. The device operational information provider 214 also receives the raw data from the various different types of wireless devices in its network shown as 216.

For example, connectivity events such as the number of retransmissions needed during a session, time interval data such as timestamped events when a client device connected, disconnected, received probe requests, was steered to another AP, or other suitable data, the number of disconnects, the type of connection failures associated with a particular device type, and any other suitable information is obtained by the device operational information provider 214 which then passes the information on as operational information 208 after suitable processing in a format desired by the cloud service 140. In one example, the device operational information provider 214 is implemented by one or more processors executing stored code that, when executed, causes the processor to perform the device operational information provider 214. However, the device operational information provider 214 may be implemented as discrete logic, such as one or more state machines, ASICs, or in any other suitable structure. Similarly, each of the other functional blocks described herein may be suitably configured as one or more state machines, application specific integrated circuits, or in any other suitable form. For purposes of illustration however, the functional blocks will be described as being implemented as one or more processors executing code.

The access points 110 also include a per-client-device-type policy data controller 216 that obtains per-client-device-type policy data 218 from the cloud service 140. The per-client-device-type policy data, as further described below, is generated based on aggregated operational information from the plurality of different types of wireless devices 121, 122, and 123 from different AP networks 102 and 104. The controller 204 controls a particular wireless client device 120, in this example device 121, that is of a first type (e.g., type of device whether a smartphone or wearable, particular manufacturer, manufacturer model, whether the device is stationary or mobile, or other data representing a desired group of devices), using the per-client-device-type policy data 218. The per-client-device-type policy data 218 is based on aggregated operational information from a plurality of different types of client wireless devices from different access point networks. In one example, the operational information 208 from differing AP networks for the same type of device types are aggregated and profiled as described below to provide improved tuning and operational capabilities on a per-client-device-type basis.

The per-client-device-type policy data controller 216 controls a client device 121 by sending a user notice to the client device, such as through an app resident on the wireless device, Short Message Service (SMS) message, or any other format indicating an action to take to improve communication within the AP network 102. In another example the cloud service 140 sends the user notice to an app on the device. This is shown as control information 220. For example, the user notice may be data that indicates to a user to move closer to access point 112 instead of access point 111 within the AP network 102. In addition to, or alternatively, the user notice may be data that indicates to the user to purchase another mesh AP to enhance the network. Any other suitable user notices may also be provided. The access point in one example also controls the wireless client device by moving (e.g., switching) the wireless client device to a different radio access technology, such as from a 2.4 gigahertz (GHz) channel to a 5 GHz channel which may also include providing a user notice, if desired. As another example, the controller 204 changes a quality of service (QoS) setting of a client device based on WLAN traffic so that the client device that streams a large amount of video is given bandwidth priority over other client devices.

As another example, the controller 204 performs a handover to the other AP 112 within the AP network 102 based on the per-client-device-type policy data 218. In another aspect, the controller 204 provides a different bandwidth allocation for the client device compared to different types of wireless client devices in an AP network 102. For example, a wireless client device type that is determined to use large amounts of bandwidth, such as a television or other device that is determined to stream a large amount of video is allocated more bandwidth over other device types in the network.

Figure 3:
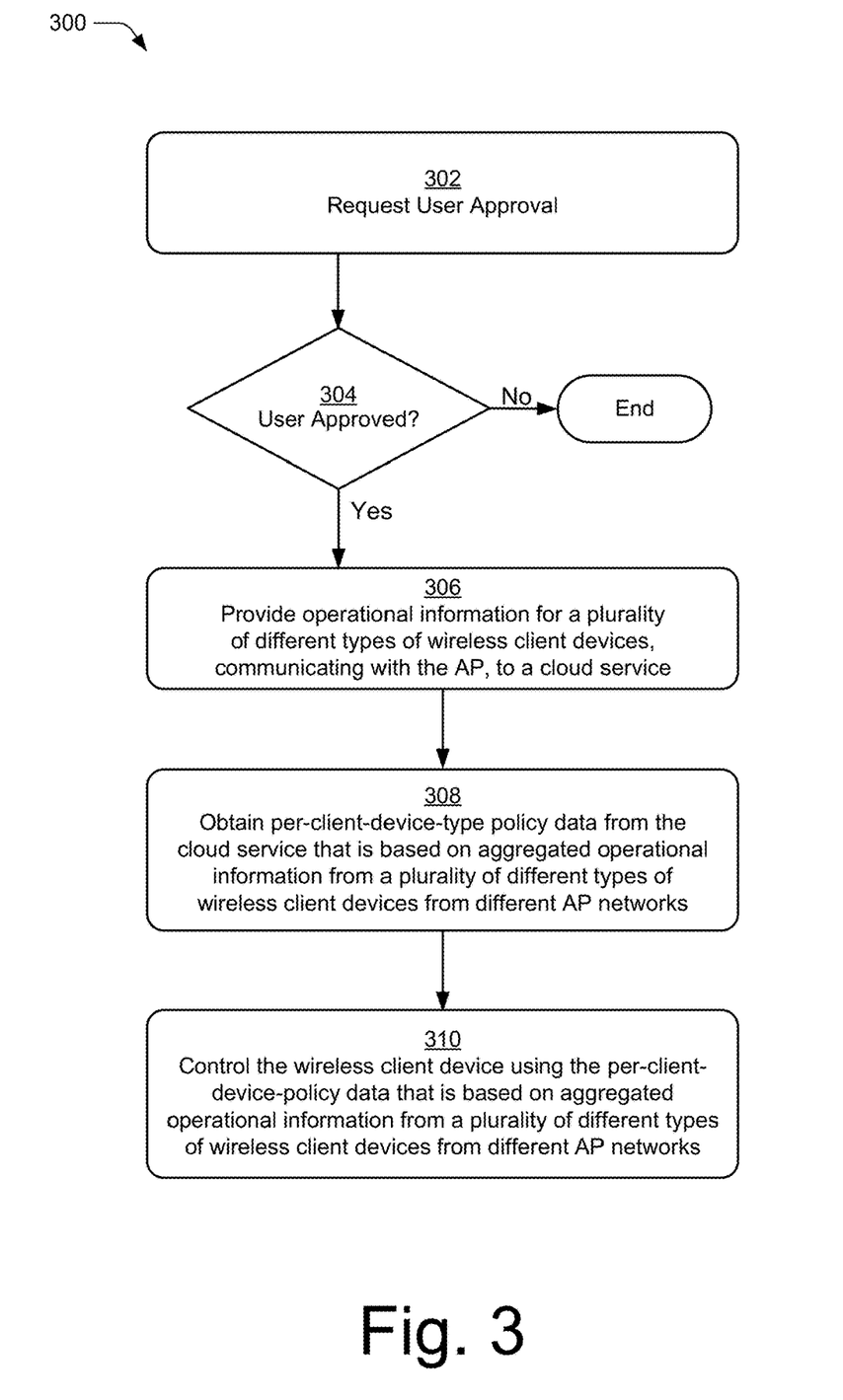
FIG. 3 illustrates an example method of controlling wireless devices using aggregated data from cross-network access points in accordance with aspects of the techniques described herein.

FIG. 3 illustrates an example method of controlling wireless devices using aggregated data from cross-network access points in accordance with aspects of the techniques described herein. At block 302, an access point requests user approval to allow communication and monitoring of operational information. For example, the AP 111 requests approval through an app on the client device 121 when the client device 121 is initially in communication with the access point 111 to allow communication and monitoring of operational information.

At block 304, if the user does not approve, the process ends. However, if user approves, at block 306, the AP provides operational information to the cloud service for the wireless client devices that are communicating with the AP. For example, the AP 111 provides operational information for the client devices 121 and 112 to the cloud service 140. Additionally, the AP 111 may provide an indication of the user's approval to the cloud service 140.

At block 308, the AP obtains per-client-device-type policy data, based on aggregated operational information from the cloud service, for different types of wireless client devices from different AP networks. For example, the AP 111 obtains, from the cloud service 140, per-client-device-type policy data 218 that is based on aggregated operational information 208 from different types of wireless client devices 120 from the AP networks 102 and 104.

At block 310, the AP controls a wireless client device that is of a first type using the per-client-device-type policy data. For example, the AP 111 controls the wireless client device 121 that is of a first type, using the per-client-device-type policy data 218 that is based on aggregated operational information 208 from multiple wireless client devices of the first type from the AP networks 102 and 104.

In aspects, different policies are provided to particular APs to enhance performance and/or connectivity with specific device types. For example, the per-client-device-type policy data 218 in one example indicates that a particular device type should be switched from a 2.4 GHz to a 5 GHz channel when a measured signal strength value of a particular device type crosses a signal strength threshold value. The signal strength threshold value can be determined based on operational information from the same or different type of client devices across different AP networks. As such, there can be different signal strength threshold values for different device types can be included in the per-client-device-type policy data 218. In general, one or more threshold values, commands and/or set points for a particular client device type can be determined based on operational information from the same or different type of client devices across different AP networks.

In another aspect, AP-level policies can be generated. For example, dynamic frequency selection (DFS) at an AP level is enhanced to allow tuning of the DFS-channel for APs 110 that are near airports. If an AP is using a channel that is also used by a radar, the AP 110 is required to discontinue use of that channel, but the use of operational information from other APs in different AP networks allows policy data to indicate that only an AP that detected the radar is required to discontinue operation on the channel and handover the client devices to another AP in the same mesh network. In one example, the radar detection event on an AP is data that will be uploaded to the cloud. In another example, also based on DFS, the AP sends data representing the total number of radar events detected on APs in a geographical area to determine that those APs are near an airport. When APs are determined to be near an airport, the policy data directs those APs to not operate on a DFS channel. Since the data is collected over an entire fleet of APs in different networks, the cloud service 140 determines what are "normal" radar-detection numbers versus high radar-detection numbers.

Figure 4:
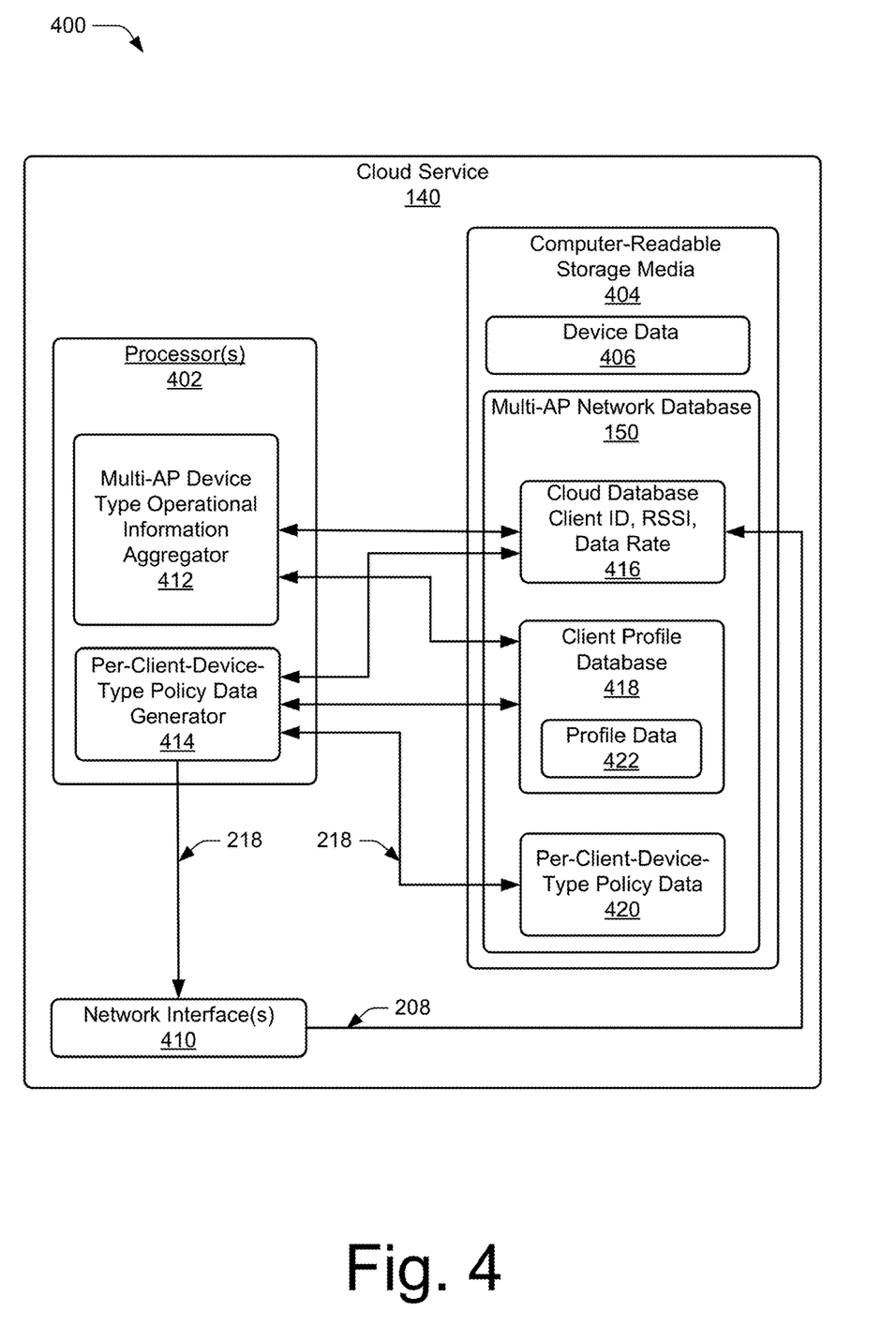
FIG. 4 illustrates an example device diagram of a cloud service that can implement various aspects of controlling wireless devices using aggregated data from cross-network access points.

FIG. 4 illustrates an example device diagram of a cloud service that can implement various aspects of controlling wireless devices using aggregated data from cross-network access points. The device diagram for the cloud service 140 shown in FIG. 4 includes a single network node (e.g., a server). The functionality of the cloud service 140 may be distributed across multiple network nodes and/or devices and may be distributed in any fashion suitable to perform the functions described herein. The cloud service 140 includes processor(s) 402 and computer-readable storage media 404 (CRM 404). The processor 402 may be a single core processor or a multiple core processor composed of a variety of materials, such as silicon, polysilicon, high-K dielectric, copper, and so on. CRM 404 may include any suitable memory or storage device such as random-access memory (RAM), static RAM (SRAM), dynamic RAM (DRAM), non-volatile RAM (NVRAM), read-only memory (ROM), hard disk drives, or Flash memory useful to store device data 406 of the cloud service 140. The CRM 404 includes applications, such as the multi-AP network database, which are executable by processor(s) 402 to enable communication with the APs 110 and the client devices 120. The cloud service 140 includes one or more network interfaces 410 for communication with the AP networks 102 and 104, via networks 130 and the processor(s) 402.

Figure 5:
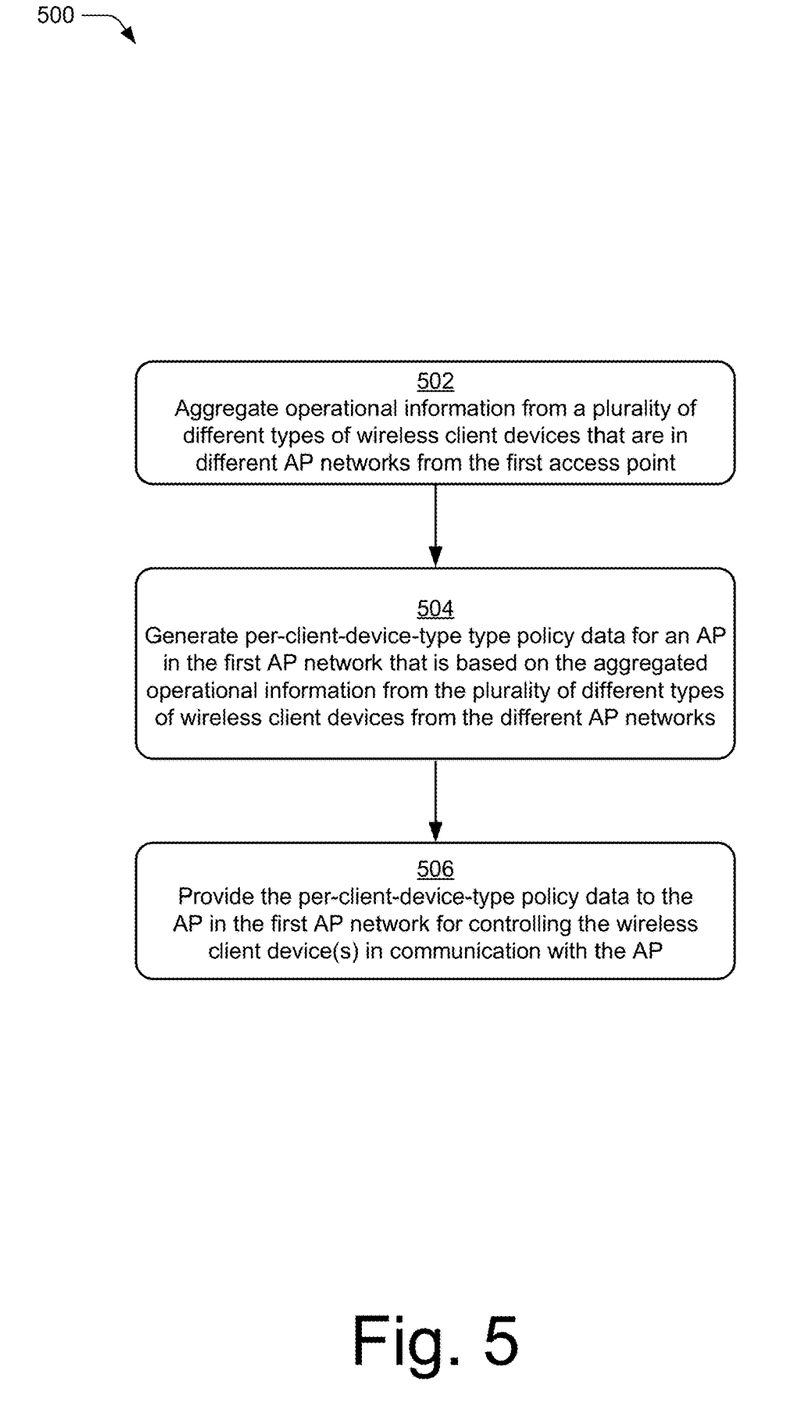
FIG. 5 illustrates an example method of controlling wireless devices using aggregated data from cross-network access points in accordance with aspects of the techniques described herein.

FIG. 5 illustrates an example method of controlling wireless devices using aggregated data from cross-network access points in accordance with aspects of the techniques described herein. At block 502, the cloud service aggregates operational information from various client devices in one or more AP networks. For example, the multi-AP device type operational information aggregator 412 included in the cloud service 140 aggregates operational information 208 from the various client devices 120 that are in the different AP networks 102 and 104. The processor(s) 402 also includes a per-client-device-type policy data generator 414. Both the multi-AP device type operational information aggregator 412 and the per-client-device-type policy data generator 414 may be implemented by one or more processors that execute stored instructions, that when executed, cause the one or more processors to operate as described herein. However, any suitable structure may be employed including one or more state machines, programmable field gate arrays, application specific integrated circuits, or any other suitable structure. The cloud service 140 in another implementation is an enterprise server. The obtained operational information 208 is stored in the cloud database 416 by an AP identifier and by a client device identifier. The cloud database 416 stores both historical operational information over a period of time as well as real time operational information. The multi-AP device type operational information aggregator 412 aggregates the real time data with prior data.

At block 504, the cloud service generates per-client-device-type policy data for an AP in the first AP network based on the aggregated operational information from the plurality of different types of wireless client devices from the different AP networks. For example, the per-client-device-type policy data generator 414 processor(s) generates per-client-device-type policy data 218. The policy data is stored in a per-client-device-type policy database 420. The per-client-device-type policy data 218 is based on the aggregated operational information 208 stored in the cloud database 416. The per-client-device-type policy data 218 is provided on a per-AP basis or a group of AP bases as desired. The per-device type policy data generator 414 provides the per-device type policy data 218 to the AP 102, in this example, for controlling the wireless devices 121 and 122 that are in communication with the AP 111.

At block 506, the cloud service provides the per-client-device-type policy data to the AP in the first AP network for controlling the wireless client device(s) in communication with the AP. For example, the per-client-device-type policy data generator 414 in the cloud service 140 communicates the per-client-device-type policy data 218 to the AP 111 using the network interface 410.

In one aspect, the per-client-device-type policy data generator 414 generates the per-device type policy data for the AP 111 and AP network 102 by generating profile data 422 on a per-client-device-type basis. The profile data 422 is based on the aggregated operational information from the plurality of different types of wireless client devices from the different AP networks 102 and 104. The per-client-device-type policy data generator 414 uses the generated client device profile data 422 to produce the per-client-device-type policy data 218.

By way of example, the processor(s) 402 generates the client-device-type profile data 422 by profiling one or more of per-client-device-type transmit/receive characteristics, data rate vs. signal strength characteristics, connection characteristics for different radio access technologies, error rate characteristics and/or connectivity events from the different types of wireless client devices from the different AP networks. The client profile database 418 stores the profile data created by the multi-AP, device type operational information aggregator 412. The multi-AP, device type operational information aggregator 412 takes the operational information stored in the cloud database 416 and, for example, runs data mining algorithms on the operational information from across different AP networks and creates the client-device-type profile data. For example, per-device type transmit/receive characteristics may be profiled (e.g., analyzed) in a way so that a particular client device type such as a particular smartphone type made by a particular manufacturer from the various AP networks are analyzed for behavioral patterns.

In one aspect, the data rate of a particular type of client device is compared to the signal strength characteristics for the data to determine, for example, what signal strength levels for a given device type provide the best data rates and the level of signal strength that provides certain data rates. For example, one smartphone type may require lower signal strength levels to provide the same data rate as another type of smartphone as determined from data across all pertinent AP networks. As such, signal strength profile data for a particular device type includes data that represents different levels of signal strength and associated data rate levels as experienced by different APs over different networks for the same type of device. Per-client-device-type policy data is then generated based on signal strength profile data, for example, through policy definition by an administrator, by applying rule data, or by applying any suitable decision algorithms. For example, this allows saving energy, particularly for of APs running on battery and/or to decrease crosstalk.

In another aspect, connection characteristics for different radio access technologies are profiled such that the number of connections is tracked for a particular device type at 2.4 GHz compared with the number of connections for the same type of device operating at 5 GHz. The profile data may indicate, for example, that a particular device type "A" only gets proper connection with a 5 GHz channel 40% of the time, whereas a different device type "B" has a 90% connection rate at 5 GHz. This would result in per-client-device-type policy data that caused the AP to leave the device type "A" on a 2.4 GHz channel to provide a better connection for device type "A."

In a further aspect, by detecting client devices with low signal strength from their APs and aggregating such information over multiple networks, an average can be determined for a given client type. This average signal strength can be used to identify client types so that a user can be provided this information so that the user can take action and move a devices closer to the AP. APs that have been placed poorly within a residence or environment are also detected. For example, if all or most of the wireless client devices associated with an AP have poor signal strength as compared to average signal strengths for those particular client types in other AP networks, placement of a particular AP is designated as being placed poorly within its environment, and a user notice is provided to the user to purchase another mesh device mesh AP device to supplement coverage.

In another aspect, a quality of service scheduler at the AP is controlled when the network device detects the current traffic types of the various different client types and prioritizes time-critical applications such as voice over IP (VoIP). For example, using operational information of video and non-video wireless clients, the network server generates per-client-device-type policy data indicating, for example, that there is a high likelihood that air time usage, or other operational information is indicative of a particular client as likely streaming video. The per-client-device-type policy data then informs the traffic scheduler at the AP for those devices to provide a particular air time usage level to prioritize that client type device over other devices or within the network.

As another aspect, high mobility client devices have been determined to experience more channel variation and/or have more need to be handed over to another AP within the network. The operational information is used to determine the client type such as a smartphone vs. a watch and non-moving clients such as television monitors and work stations, so that the operational information is used to estimate the level of mobility of a client. Such information is used so that the policy data causes the AP to provide a quality of service operation to provide a smart handover for those client types determined to be mobile vs. non-mobile devices.

Stated another way, to generate the profile data, the multi-AP device type operational information aggregator 412 after having aggregated various data from multiple different networks, aggregates the data on a per-client-device-type basis and creates, for example, profile tables for various characteristics that indicate behaviors of different device types. For example, profile data may be one or more tables representing signal strength levels and corresponding percent of time that a particular type of device is connected to a particular radio access technology (e.g., 5 GHz or 2.4 GHz bands). Profile data is then accessed by the per-client-device-type policy data generator 414 which uses administrator input, rules, or any other suitable algorithms to generate policy data on a per-client-device-type basis. For example, using the signal strength and percent of time connected information, the per-client-device-type policy data generator 414 generates policy data based on, for example, that a particular device type operates at a particular signal strength level 90% of the time whereas the different device type operates at a lower signal strength level 40% of the time on the same radio access technology (RAT) (e.g., 5 GHz). The resulting policy data for the given device type in this example is a policy for the appropriate AP to not move the device that connects 90% of the time to 5 GHz from a lower 2.4 GHz band if the device is on a 2.4 GHz band. The reason being the rule data used by 414 indicates that it is likely that the device which normally automatically connects to 5 GHz band is, for some reason, on a 2.4 GHz band which is rare. Therefore keeping the device on the 2.4 GHz band is likely the best action based on historical data of similar type devices across differing networks.

Figure 6:
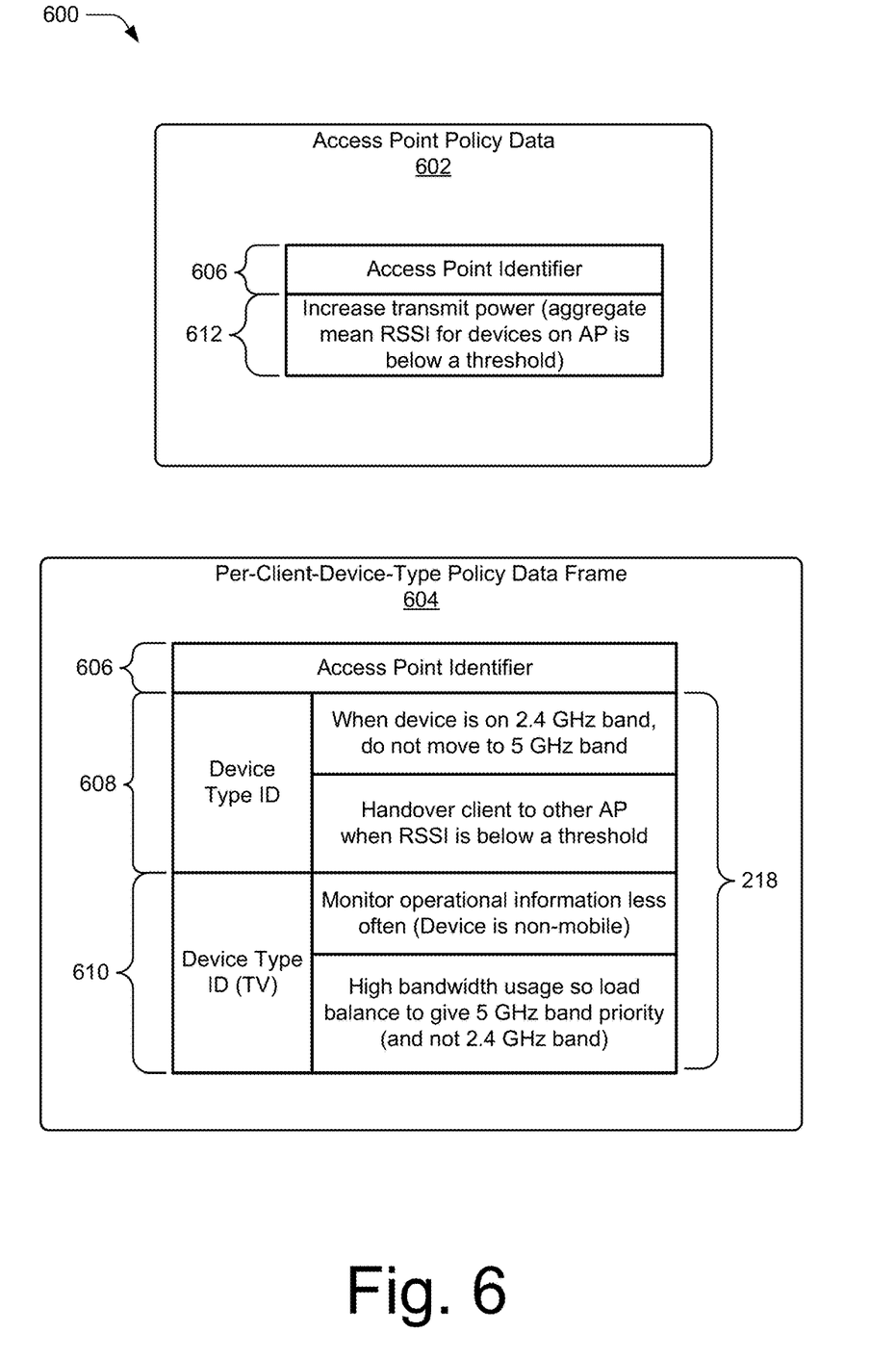
FIG. 6 illustrates an example of policy data based on operational information in accordance with aspects of the techniques described herein.

FIG. 6 illustrates an example of policy data based on operational information in accordance with aspects of the techniques described herein. The per-client-device-type policy data generator 414 accesses the cloud database 416 as well to determine which client devices are currently in communication with particular APs. The client ID data from the cloud database is used so that only policy data for clients that are in connection with the AP or are associated with an AP are generated, and sent. FIG. 6 illustrates one example of an AP level policy data frame 602 and a per-client-device-type policy data frame 604. However, the policy data may be communicated in any suitable format. The per-client-device-type policy data frame 604 includes AP identification data 606 that identifies a particular AP and one or more device identifiers 608 and 610 that are associated with particular clients. A device ID may be, for example, any data representing a particular device type, such as a hash of a MAC address, or any other suitable identifier. Per-client-device-type policy data 218 for each device type is also provided. In this example, the device type, represented by device ID 608, has a policy indicating that when the device type is on a 2.4 GHz band, do not move the device to a 5 GHz band for the reason as noted above. Additionally or alternatively, in this example other policy data indicates to hand over the device type to another AP when the signal strength is below a threshold is also provided. Again, this is based on data obtained for the same client device across different networks indicating, for example, that the device has a good performance above a particular signal strength threshold, and if the signal strength is below such a threshold, that the device type should be moved to another AP in the network.

Device type ID 610 in this example represents a non-moving device such as a television monitor. In this example, the policy data indicates that the AP can monitor the operational information less frequently since the signal strength levels and other operational information is less likely to vary over time because it has been determined that the device type is a non-mobile device. In this example, the device type has also been determined to use large amounts of bandwidth through the aggregation of bandwidth data for the device type across differing networks. As such, the per-client-device-type policy data 218 indicates that the AP should provide load balancing for this device type to give the higher bandwidth RAT priority. In this case, the device type ID 610 receives a higher priority on the 5 GHz band than other device types by the AP. It will be recognized that these are merely examples and that any suitable per-client-device-type policy data may be employed.

The AP level policy data frame 602 also includes AP identification information 606 and the AP policy data 612 on an AP-level as opposed to a per-client-device-type level. In this example, the AP policy data 612 indicates that the AP should increase transmit power. For example, the per-client-device-type policy data generator 414 determines that the particular device types that this AP is associated with require a higher signal strength than other device types based on signal strength information from differing networks for the same device type. In another example, based on aggregating the radar events in a certain geographical area, it is determined that there is an airport (or something else that can trigger radar events) nearby. So, the policy states explicitly that the AP(s) are not to use a DFS channel of operation.

As described above, historical database policies use operational information that is obtained over a desired period of time. In another example, historical operational information for each AP and per-client-device-type is aggregated and evaluated to determine such things as a total transmitted data over all APs by different device types in a given geographic region during a particular event such as the Superbowl. Knowing a prior year's traffic pattern for an event is used to manage traffic patterns in a future year during the next Superbowl through a per-client-device-type policy data provided to multiple APs for particular devices if desired.

As noted above, the operational information is collected on a per-AP and per-associated-client level that are aggregated over multiple different AP networks and is used to identify anomalies in client devices and AP performance. The per-associated-client-level information is on a per-client-device-type basis such as whether the client device is a television, printer, particular smartphone (same manufacturer and different model or different manufacturers), wearable, laptop, or any other suitable device that communicates with an access point. As a result, per-client-device-type policy data based on operational information from the same type of client devices in different networks is generated and provided to the appropriate AP which then uses the per-client-device-type policy data to control the wireless client device to improve operation of the wireless client device and/or AP and/or AP network.

In situations in which the systems and methods discussed herein may collect personal information about users or may make use of personal information (e.g., user data), users are provided with one or more opportunities to control how information is collected about the user and used in one or more described features. A user is provided with control over whether programs or features collect user data [e.g., information about a user's social network, user characteristics (age, gender, profession, etc.), social actions or activities, a user's preferences, content created or submitted by a user, a user's current geographic location, etc.]. A user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected, and as to which portions of the information are to be collected. For example, users can be provided with one or more control options over a communication network. In addition, certain data may be treated in one or more ways before it is stored or used so that personally identifiable information is removed. For example, a user's identity may be treated so that no personally identifiable information can be determined for the user, or a user's geographic location may be generalized to a larger region so that a particular location of a user cannot be determined.

Generally, any of the components, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

In the following some examples are described

EXAMPLE 1

A method for controlling a client device in a first access point (AP) network by a cloud service, the method comprising:
aggregating, by a cloud service, operational information from a plurality of different types of wireless client devices that are in different AP networks from the first access point;
generating, by the cloud service, per-client-device-type policy data for an AP in the first AP network, the per-client-device-type-policy data being based on the aggregated operational information from the plurality of different types of wireless client devices from the different AP networks; and
providing, by the cloud service, the per-client-device-type policy data to the AP in the first AP network that is effective to direct the AP to control the client device.

EXAMPLE 2

The method of example 1, further comprising:
receiving, by the cloud service and using a network, the operational information for the aggregating.

EXAMPLE 3

The method of example 2, wherein the received operational information from the plurality of different types of wireless client devices includes an identifier of each wireless client device.

EXAMPLE 4

The method of example 3, wherein the identifier of each wireless client device is a hashed value of a Media Access Control (MAC) address of the wireless client device.

EXAMPLE 5

The method of any of the preceding example, wherein generating per-client-device-type policy data for the AP in the first AP network comprises:
generating, by the cloud service, client profile data on a per-client-device-type basis based on the aggregated operational information from the plurality of different types of wireless client devices from the different AP networks; and
using the generated client device type profile data, based on the aggregated operational information from the plurality of different types of wireless client devices from the different AP networks, to produce the per-client-device-type policy data.

EXAMPLE 6

The method of example 5, wherein generating the client device type profile data comprises profiling at least one of: a per-client-device-type transmit characteristic, a per-client-device-type receive characteristic, data rate versus signal strength characteristics, connection characteristics for different radio access technologies, error rate characteristics, or connectivity events, from the plurality of different types of wireless client devices from the different AP networks.

EXAMPLE 7

The method of any of the preceding example, further comprising:
storing, by the cloud service, the operational information, client profile data, and the per-client-device-type policy data in a database.

EXAMPLE 8

A system for controlling a client device in a first access point (AP) network, the system comprising means for carrying out the method of any of examples 1 to 7.

EXAMPLE 9

A method for controlling a wireless client device by an access point (AP) in an AP network, the method comprising:

providing, by the AP, operational information from a plurality of different types of client devices communicating with the AP, to a cloud service;

obtaining, by the AP, per-client-device-type policy data from the cloud service that is based on aggregated operational information from a plurality of different types of client devices from different AP networks; and controlling, by the AP, the wireless client device that is of a first type, using the per-client-device-type policy data for the first type based on aggregated operational information from a plurality of different types of client devices from different AP networks.

EXAMPLE 10

The method of example 9, wherein the wireless client device is associated with the first type.

EXAMPLE 11

The method of examples 9 or 10, further comprising:

collecting, by the AP, the operational information for the plurality of different types of client devices communicating with the AP.

EXAMPLE 12

The method of example 11, further comprising:

sending, by the AP, a request for user approval for collecting operational information to the wireless client device that is effective to direct the wireless client device to present the request to a user; and receiving an indication of the approval or disapproval of the user from the wireless client device.

EXAMPLE 13

The method of example 12, wherein the approval of the user is required for the collecting the operational information for the plurality of different types of client devices communicating with the AP.

EXAMPLE 14

The method of any of example 9 to 13, wherein the providing the operational information further comprises:

providing an identifier of each of the plurality of different types of client devices.

EXAMPLE 15

The method of any of examples 9 to 14, wherein controlling the wireless client device comprises at least one of:

sending, by the AP, a user notice to the wireless client device indicating an action to take to improve communication within the AP network;

moving the wireless client device to a different radio access technology (RAT) of the AP;

changing a quality of service (QoS) setting of a client device based on traffic;

handing over the wireless client device to another AP in the AP network; and providing a different bandwidth allocation for the wireless client device compared to different types of client devices in the AP network.

EXAMPLE 16

A wireless local area network (WLAN) access point (AP) device comprising:

a wireless transceiver;

a controller; and a memory comprising instructions executable by the controller to configure the AP to:

provide operational information from a plurality of different types of client devices communicating with the AP, to a cloud service;

obtain per-client-device-type policy data from the cloud service that is based on aggregated operational information from a plurality of different types of client devices from different AP networks; and control, using the wireless transceiver, a wireless client device that is of a first type, using the per-client-device-type policy data for the first type based on aggregated operational information from a plurality of different types of client devices from different AP networks.

EXAMPLE 17

The WLAN AP device of example 16, wherein the wireless client device is associated with the first type.

EXAMPLE 18

The WLAN AP device of example 16 or 17, wherein the instructions are executable by the controller to configure the AP to:

collect the operational information for the plurality of different types of client devices communicating with the AP.

EXAMPLE 19

The WLAN AP device of example 18, wherein the instructions are executable by the controller to configure the AP to:

send a request for user approval for collecting operational information to the wireless client device that is effective to direct the wireless client device to present the request to the user; and receive an indication of the approval or disapproval of the user from the wireless client device.

EXAMPLE 20

The WLAN AP device of example 19, wherein the approval of the user is required for the collection of the operational information for the plurality of different types of client devices communicating with the AP.

EXAMPLE 21

The WLAN AP device of any of examples 16 to 20, wherein the instructions are executable by the controller to configure the AP to:

sending, by the AP, a user notice to the wireless client device indicating an action to take to improve communication within the AP network;

moving the wireless client device to a different radio access technology (RAT) of the AP;

changing a quality of service (QoS) setting of a client device based on traffic;

handing over the wireless client device to another AP in the AP network;

providing a different bandwidth allocation for the wireless client device compared to different types of client devices in the AP network; or any combination thereof.

Although aspects of controlling wireless devices using aggregated data from cross-network access points have been described in language specific to features and/or methods, the subject of the appended claims is not necessarily limited to the specific features or methods described. Rather, the specific features and methods are disclosed as example implementations of controlling wireless devices using aggregated data from cross-network access points, and other equivalent features and methods are intended to be within the scope of the appended claims. Further, various different aspects are described, and it is to be appreciated that each described aspect can be implemented independently or in connection with one or more other described aspects.

What is claimed is:

1. A method for controlling a client device in a first access point (AP) network by a cloud service, the method comprising:
 aggregating, by a cloud service, operational information from a plurality of different types of wireless client devices that are in different AP networks from the first access point;
 generating, by the cloud service, per-client-device-type policy data for an AP in the first AP network, the per-client-device-type-policy data being based on the aggregated operational information from the plurality of different types of wireless client devices from the different AP networks; and
 providing, by the cloud service, the per-client-device-type policy data to the AP in the first AP network that is effective to direct the AP to control the client device by performing a handover of the wireless client device to another AP in the AP network based on the per-client-device-type policy data.

2. The method of claim 1, further comprising:
 receiving, by the cloud service and using a network, the operational information for the aggregating.

3. The method of claim 2, wherein the received operational information from the plurality of different types of wireless client devices includes an identifier of each wireless client device.

4. The method of claim 3, wherein the identifier of each wireless client device is a hashed value of a Media Access Control (MAC) address of the wireless client device.

5. The method of claim 1, wherein generating per-client-device-type policy data for the AP in the first AP network comprises:
 generating, by the cloud service, client profile data on a per-client-device-type basis based on the aggregated operational information from the plurality of different types of wireless client devices from the different AP networks; and
 using the generated client device type profile data, based on the aggregated operational information from the plurality of different types of wireless client devices from the different AP networks, to produce the per-client-device-type policy data.

6. The method of claim 5, wherein generating the client device type profile data comprises profiling at least one of: a per-client-device-type transmit characteristic, a per-client-device-type receive characteristic, data rate versus signal strength characteristics, connection characteristics for different radio access technologies, error rate characteristics, or connectivity events, from the plurality of different types of wireless client devices from the different AP networks.

7. The method of claim 1, further comprising:
 storing, by the cloud service, the operational information, client profile data, and the per-client-device-type policy data in a database.

8. A method for controlling a wireless client device by an access point (AP) in an AP network, the method comprising:
 providing, by the AP, operational information from a plurality of different types of client devices communicating with the AP, to a cloud service;
 obtaining, by the AP, per-client-device-type policy data from the cloud service that is based on aggregated operational information from a plurality of different types of client devices from different AP networks; and
 controlling, by the AP, the wireless client device that is of a first type, to hand over the wireless client device to another AP in the AP network using the per-client-device-type policy data for the first type based on aggregated operational information from a plurality of different types of client devices from different AP networks.

9. The method of claim 8, wherein the wireless client device is associated with the first type.

10. The method of claim 8, further comprising:
 collecting, by the AP, the operational information for the plurality of different types of client devices communicating with the AP.

11. The method of claim 10, further comprising:
 sending, by the AP, a request for user approval for collecting operational information to the wireless client device that is effective to direct the wireless client device to present the request to a user; and
 receiving an indication of the approval or disapproval of the user from the wireless client device.

12. The method of claim 11, wherein the approval of the user is required for the collecting the operational information for the plurality of different types of client devices communicating with the AP.

13. The method of claim 8, wherein the providing the operational information further comprises:
 providing an identifier of each of the plurality of different types of client devices.

14. The method of claim 8, wherein controlling the wireless client device further comprises at least one of:
 sending, by the AP, a user notice to the wireless client device indicating an action to take to improve communication within the AP network;
 moving the wireless client device to a different radio access technology (RAT) of the AP;
 changing a quality of service (QoS) setting of a client device based on traffic; and
 providing a different bandwidth allocation for the wireless client device compared to different types of client devices in the AP network.

15. A wireless local area network (WLAN) access point (AP) device comprising:
 a wireless transceiver;
 a controller; and
 a memory comprising instructions executable by the controller to configure the AP to:
  provide operational information from a plurality of different types of client devices communicating with the AP, to a cloud service;
  obtain per-client-device-type policy data from the cloud service that is based on aggregated operational information from a plurality of different types of client devices from different AP networks; and control, using the wireless transceiver, a wireless client device that is of a first type, to hand over the wireless client device to another AP in the AP network using the per-client-device-type policy data for the first type based on aggregated operational information from a plurality of different types of client devices from different AP networks.

16. The WLAN AP device of claim 15, wherein the wireless client device is associated with the first type.

17. The WLAN AP device of claim 15, wherein the instructions are executable by the controller to configure the AP to:
collect the operational information for the plurality of different types of client devices communicating with the AP.

18. The WLAN AP device of claim 17, wherein the instructions are executable by the controller to configure the AP to:
send a request for user approval for collecting operational information to the wireless client device that is effective to direct the wireless client device to present the request to the user; and
receive an indication of the approval or disapproval of the user from the wireless client device.

19. The WLAN AP device of claim 18, wherein the approval of the user is required for the collection of the operational information for the plurality of different types of client devices communicating with the AP.

20. The WLAN AP device of claim 15, wherein the instructions are executable by the controller to further configure the AP to:
sending, by the AP, a user notice to the wireless client device indicating an action to take to improve communication within the AP network;
moving the wireless client device to a different radio access technology (RAT) of the AP;
changing a quality of service (QoS) setting of a client device based on traffic;
providing a different bandwidth allocation for the wireless client device compared to different types of client devices in the AP network; or
any combination thereof.

* * * * *